(12) United States Patent
Korba et al.

(10) Patent No.: US 7,973,427 B2
(45) Date of Patent: Jul. 5, 2011

(54) CONVERTER CONTROL UNIT

(75) Inventors: Petr Korba, Turgi (CH); Rudolf Wieser, Baden-Dättwil (CH); Srinivas Ponnaluri, Untersiggenthal (CH); Mats Larsson, Baden (CH); Alexandre Oudalov, Fislisbach (CH); Jose Taborda, Kirchdorf (CH); Peter Steimer, Ehrendingen (CH)

(73) Assignee: ABB Research Ltd, Zurich (CH)

( * ) Notice: Subject to any disclaimer, the term of this patent is extended or adjusted under 35 U.S.C. 154(b) by 247 days.

(21) Appl. No.: 12/201,493

(22) Filed: Aug. 29, 2008

(65) Prior Publication Data

US 2009/0079267 A1 Mar. 26, 2009

Related U.S. Application Data

(63) Continuation of application No. PCT/CH2007/000106, filed on Mar. 2, 2007.

(30) Foreign Application Priority Data

Mar. 2, 2006 (EP) .................................... 06405090

(51) Int. Cl.
*H01J 1/10* (2006.01)
(52) U.S. Cl. ......................................................... 307/43
(58) Field of Classification Search ...................... 307/43
See application file for complete search history.

(56) References Cited

U.S. PATENT DOCUMENTS

| 4,999,564 | A | 3/1991 | D'Antonio et al. |
| 6,476,521 | B1 * | 11/2002 | Lof et al. ...................... 307/105 |
| 6,845,333 | B2 | 1/2005 | Anderson et al. |

FOREIGN PATENT DOCUMENTS

| EP | 1 134 867 A1 | 9/2001 |
| EP | 1 416 603 A1 | 5/2004 |
| EP | 1 780 858 A1 | 5/2007 |
| JP | 63-59798 A | 3/1988 |
| JP | 3-78477 A | 4/1991 |

OTHER PUBLICATIONS

Li Wang, "Damping of Torsional Oscillations Using Excitation Control of Synchronous Generator: The IEEE Second Benchmark Model Investigation", IEEE Transactions on Energy Conversion, IEEE Service Center, vol. 6, No. 1, Mar. 1, 1991, pp. 47-54.
PCT/ISA/210.
PCT/ISA/237.
EPO Form 1507N.

* cited by examiner

*Primary Examiner* — Robert L. Deberadinis
(74) *Attorney, Agent, or Firm* — Buchanan Ingersoll & Rooney PC

(57) ABSTRACT

The disclosure relates to a converter control unit or power system stabilizing unit for counteracting oscillations in electric power systems that is equipped and employed to provide and processes information for system-wide monitoring, protection, control and metering. It comprises means for synchronized (e.g. via GPS or another absolute/global time reference) sampling of voltages and/or currents, means for down-sampling in order to decrease the number of samples, and means for calculating phasors, i.e. time stamped amplitude and phase angle of the voltages and/or currents.

8 Claims, 1 Drawing Sheet

CONVERTER CONTROL UNIT

RELATED APPLICATIONS

This application claims priority under 35 U.S.C. §119 to EP Application 06405090.9 filed in Europe on Mar. 2, 2006, and as a continuation application under 35 U.S.C. §120 to PCT/CH2007/000106 filed as an International Application on Mar. 2, 2007 designating the U.S., the entire contents of which are hereby incorporated by reference in their entireties.

TECHNICAL FIELD

The disclosure relates to the field of wide-area monitoring, protection and control of an electric power system. For example, a converter control unit is disclosed for controlling a converter based on power electronic semiconductor components and arranged in the electric power system.

BACKGROUND INFORMATION

An electric power system comprises a power transmission and/or distribution network interconnecting geographically separated regions, and a plurality of substations at the nodes of the power network. The substations include equipment for transforming voltages and for switching connections between individual lines of the power network. Power generation and load flow to consumers is managed by a central Energy Management System (EMS) and/or supervised by a Supervisory Control And Data Acquisition (SCADA) system.

In the past years, continued load growth without a corresponding increase in transmission resources has resulted in reduced operational margins for many power systems worldwide, and has led to operation of power systems ever closer to their stability limits. Likewise, load transmission and wheeling of power from distant generators to local load consumers has become common practice, and led to substantially increased amounts of power being transmitted through the existing networks, occasionally even causing transmission bottlenecks and electromechanical oscillations of parts of the electric power systems. These issues together with the ongoing worldwide trend towards deregulation of the electric power markets on the one hand and the increased need for accurate and better network monitoring on the other hand, have created a demand for dynamic wide area monitoring, protection and control that goes beyond the rather static view as provided by SCADA/EMS.

A state or condition of an electric power system at one specific point in time can be obtained from a plurality of synchronized phasor measurements or snapshots collected across the electric power system or power transmission network. Phasors are time-stamped, complex values such as amplitude and phase, of local electric quantities such as currents, voltages and load flows, and can be provided by means of stand-alone Phasor Measurement Units (PMU). These units involve a very accurate global time reference, obtained e.g. by using the Global Positioning Satellite (GPS) system or any other comparable means, and allowing synchronization of the time-stamped values from different locations. The phasors are typically calculated at a rate of 10 to 60 Hz from an internal sampling rate of 2.4 kHz, and thus can provide a view on transient or sub-transient states. Conventionally, PMUs are placed at selected substations of a power network, and forward their measured phasor values to a central System Protection Centre at control level. In the U.S. Pat. No. 6,845,333, a protective relay as part of a Substation Automation system is disclosed, which comprises means for producing synchronized voltage or current phasor values as well as means for receiving voltage or current values from another, remote relay via a communication channel.

The mechanism by which interconnected synchronous machines in large power systems maintain synchronism with one another is through restoring forces which act whenever there are forces tending to accelerate or decelerate one or more generators with respect to other generators in the system. In addition, Power System Stabilizers (PSS) are provided to add damping torque to the generator oscillations by modulation of the generator excitation signal. PSS devices enhance small-signal stability and improve the damping of both plant mode oscillations and inter-area modes of power oscillation. Conventional PSS devices operate locally, using exclusively local measurements for decisions on how to control generator excitation or damp power system oscillations. These estimations or detections are based primarily on variations of shaft speed, terminal frequency, electric power and accelerating power of the machine and are typically sampled every 25 µs, i.e. at a sampling frequency of 40 kHz.

Power oscillations in fact give rise to variations in these quantities, but as also other phenomena may affect them, the detection of relevant power system oscillations from these measurements is a very complex task. Hence the general problem is that the measured quantities often are insufficient to efficiently detect the power system oscillations or the mode of oscillation. The U.S. Pat. No. 6,476,521 discloses a system protection scheme based on measurements of time-stamped signals in at least two locations of the power system that are evaluated in view of poorly damped power oscillations. Direct measurement of a node angle difference between the at least two points in a power system provides an improved picture of the rotor angle oscillations compared to indirect local measurements as evaluated in the case of conventional Power System Stabilizers (PSS).

SUMMARY

Exemplary embodiments disclosed herein can enable, without incurring heavy infrastructural investments, phasor-based monitoring, protection and control applications in electric power systems equipped with converters based on power electronic semiconductor components. A converter control unit is disclosed for controlling a converter and a method is disclosed of performing wide-area protection and control applications.

A converter control unit is disclosed for controlling a converter based on power electronic semiconductor components and arranged in an electric power system, wherein the unit comprises a synchronization means providing time-stamps for global time synchronization and a phasor data facility for calculating, based on signals from an instrument transformer representing a current or voltage of the power system, time-stamped synchronized phasor data.

A method is disclosed of performing, based on time-stamped synchronized phasor data, wide-area protection and control applications on an electric power system, wherein the power system comprises a converter based on power electronic semiconductor components and operated by means of a dedicated converter control unit, the method comprising: providing time-stamps for global time synchronization by a synchronization means and calculating time-stamped synchronized phasor data by a phasor data facility integrated into the converter control unit, deriving wide-area protection and control commands from the time-stamped synchronized phasor data, and applying the protection and control commands to the converter.

In another aspect, an arrangement is disclosed for wide-area protection and control of an electric power system. Such an arrangement comprises a converter based on power electronic semiconductor components; and a dedicated converter control unit. The dedicated converter control unit functions to provide time-stamps for global time synchronization and calculate time-stamped synchronized phasor data, issue wide-area protection and control commands based on the time-stamped synchronized phasor data, and apply the protection and control commands to the converter.

BRIEF DESCRIPTION OF THE DRAWINGS

The subject matter of the disclosure will be explained in more detail in the following text with reference to exemplary embodiments which are illustrated in the attached drawings, of which.

The reference symbols used in the drawings, and their meanings, are listed in summary form in the list of reference symbols. In principle, identical parts are provided with the same reference symbols in the figures.

DETAILED DESCRIPTION

Figure 1:
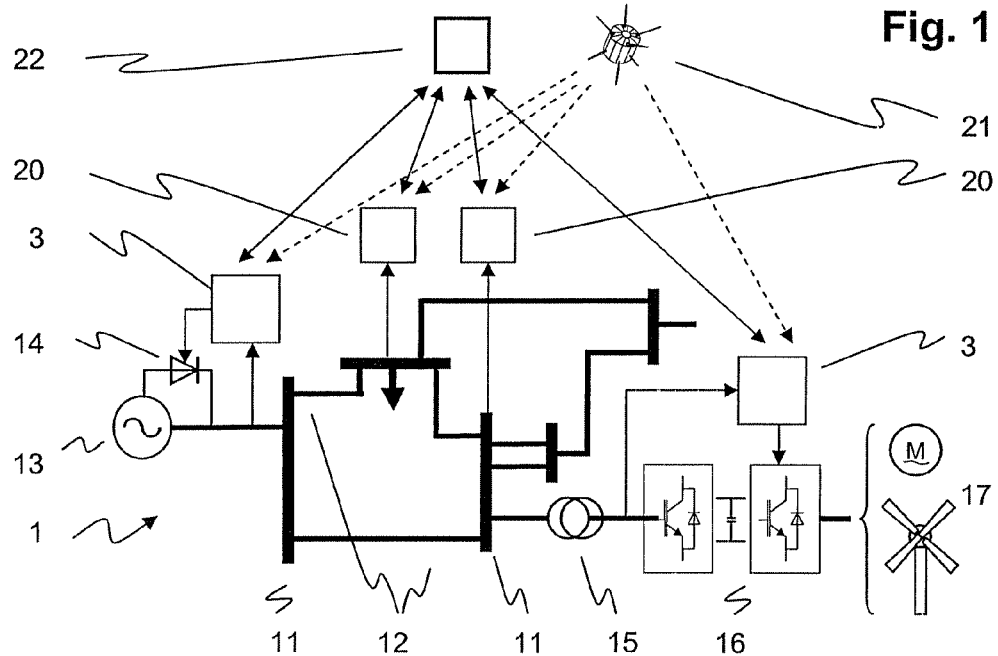
FIG. 1 schematically shows an exemplary electric power system.

According to the present disclosure, converter control units are equipped and employed to provide and process phasor data for wide-area monitoring, protection and control functions, thus requiring less dedicated phasor measurement units to be installed in the electric power system. An economy in hardware components can be achieved, as e.g. the housing and a power supply of an individual converter control unit may also be used for accommodating and for supplying power to both a synchronization means providing time-stamps for global time synchronization and a phasor data facility for calculating the time-stamped synchronized phasor data. In addition, the integration of the aforementioned synchronization means and phasor data facility into the converter control unit may comprise implementing the corresponding functionality completely or partly in the existing hardware of the converter control unit.

In an exemplary method of performing wide-area protection and control applications according to the disclosure, the converter controlled by the converter control unit is itself employed as an actuator for the execution of control commands required by the wide-area protection and control applications and derived from the phasors calculated at said converter control unit.

In an exemplary embodiment of the disclosure, the converter is an excitation converter for a generator of the power system, forming a generator excitation system together with the converter control unit. The latter is generally responsible for stabilizing an electric power system against power oscillations, and comprises means for producing, based on a generator voltage $V_G$ and/or a generator current $I_G$ of a generator of the power system, stabilizing control signals for the excitation converter. As indicated above, the converter control unit comprises further a synchronization means providing time-stamps for global time synchronization and a phasor data facility for calculating, based on the generator voltage $V_G$ and/or the generator current $I_G$ of the generator, time-stamped synchronized phasor data.

In this context, it has been realized that phasor data for wide-area applications is not necessarily required to originate from substations or other nodes of the power system, but that generator currents and voltages likewise represent suitable system quantities for the purpose of calculating phasors. Hence a generator excitation system with a power system stabilizer, or a power system stabilizing unit, are equipped and employed to provide and process phasor data for wide-area monitoring, protection and control functions. Generator signals provided by instrument transformers and indicative of a generator current or a generator voltage, which are evaluated by the power system stabilizing functionality in view of damping electromechanical oscillations, are also used to calculate phasor data, i.e. time stamped amplitude and phase angle values of the generator voltage and/or current. Accordingly no separate instrument transformers have to be provided for the purpose of phasor measurements.

In one aspect of this exemplary embodiment, sampled generator signals are obtained by sampling the generator signals at a high sampling rate adapted to the needs of the power system stabilizer. The sampled generator signals are then down-sampled and/or filtered in order to produce the phasors at a phasor update frequency which is distinctively below the abovementioned sampling rate. Accordingly, no separate sampling means or A/D converter has to be provided for the purpose of phasor measurements.

In an exemplary embodiment of the disclosure, a communication interface is provided for transmitting the calculated phasor data to a system protection centre or other intelligent electronic device, where the monitoring, protection and control calculations for the wide-area applications are performed. Resulting protection and control signals may be received via this communication interface and used to control the converter in view of said wide-area functionality.

FIG. 1 shows an exemplary power system 1 with a number of substations represented each by a bus bar 11 and interconnected by transmission lines 12 forming a grid or electrical power transmission network. From a topological point of view, the bus bars 11 in the substations form the nodes of the network of the power system 1. Accordingly, two dedicated Phasor Measurement Units 20 have been assigned to two of the bus bars. They receive a global synchronized time signal from GPS-satellite 21 and are communicatively connected to System Protection Centre 22.

The power system 1 further comprises a generator 13 and an associated excitation converter 14 controlled by a converter control unit 3, as well as a power converter 16. The latter connects, in general via a power transformer 15, sources or consumers 17 of active or reactive power to the grid, and is likewise controlled by a converter control unit 3. Excitation converter 14 and power converter 16, just like any converter based on power electronic semiconductor components, comprise a multitude of semiconductor components or modules that are individually controlled by control signals produced by gate drives or other control hardware of the converter control unit 3. The converter control units 3 in turn are capable of receiving the global synchronized time signal from GPS satellite 21 and of providing synchronized phasors to System Protection Centre 22.

In general, power converters such as rectifiers, invertors, choppers and cycloconverters are connected to the electric power transmission or distribution grid and are generating or consuming active power. For instance, and as schematically indicated in FIG. 1, in a wind power application, electric power is generated, whereas in a motor drive application, active power is consumed. In frequency interties two networks of different nominal frequency are connected, in which case active power is exchanged in either direction.

Based on time-stamped synchronized phasor data, wide-area protection and control applications are engaged, and corresponding control signals are devised and applied to different actuators. At least for certain of the applications mentioned, such as damping of electromechanical oscillations in the power system, the above power converters represent valuable actuators. Power converters enable to exchange active power with low frequency, e.g. by reducing temporarily the active power drawn from the grid for a motor drive by reducing its speed, and offer an even larger degree of freedom when it comes to supplying reactive power for the purpose of said wide-area applications. What has been said in the foregoing with respect to wide-area protection and control applies primarily to the power system as a whole. However, in configurations with so-called distributed generation or even islanding of a part of the overall power system separated from the latter by a power converter, the protection and control applications may be tailored and executed according to the requirements of said part, sub-system, local grid or micro-grid.

Figure 2:
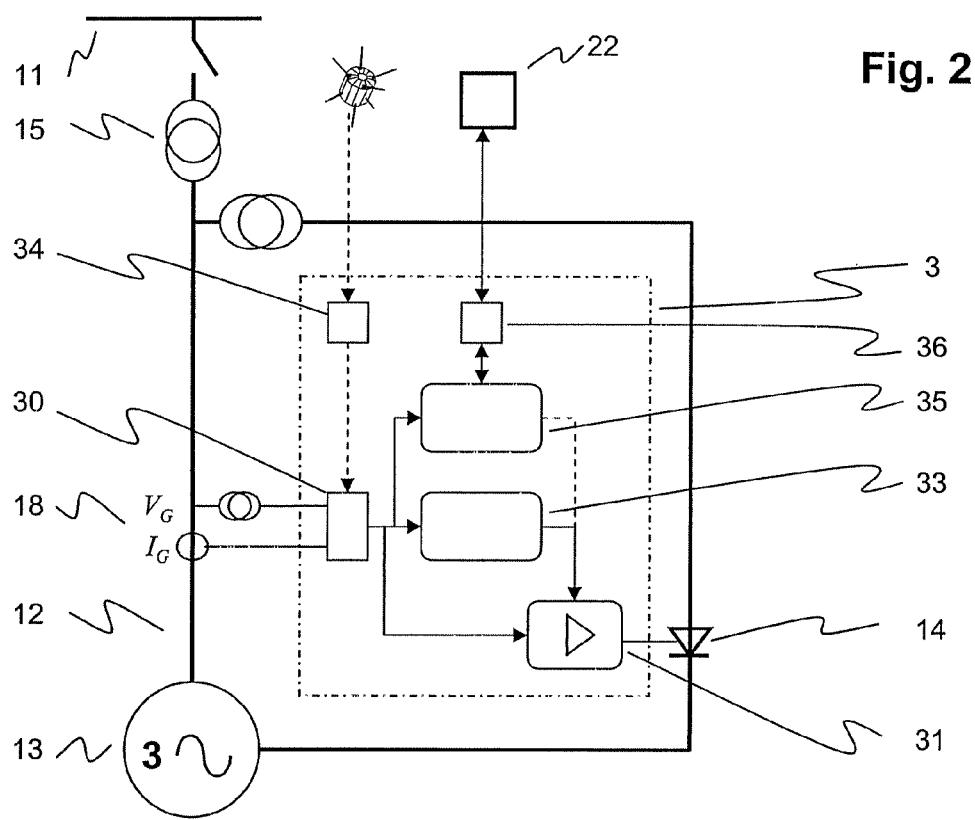
FIG. 2 depicts functional blocks or components of an exemplary generator excitation system.

FIG. 2 depicts in greater detail an implementation of the disclosure with an exemplary excitation converter 14. Three-phase generator 10 is connected via line 12 and power transformer 15 to the bus bar 11. Instrument transformers 18 comprising a current and a voltage transformer provide signals indicative of a generator current $I_G$ and a generator voltage $V_G$ in line 12 to the converter control unit 3 of an excitation system of the generator 13. The converter control unit 3 comprises a number of components or subsystems 30-36 which are depicted in FIG. 2 as functional blocks. An analogue-to-Digital (A/D) converter 30 samples the analogue signals from the instrument transformers 18 and provides sampled data to converter gate drives 31. The latter control, e.g. by means of a closed loop configuration the output voltage of an excitation converter 14 with the primary aim to maintain a terminal voltage of the generator 13. Converter gate drives 31 are also known as Automatic Voltage Regulators (AVR) and/or Static Excitation Systems (SES).

Converter control unit 3 further comprises a means for power system stabilizing called Power System Stabilizer (PSS) 33. Network faults or network operation close to the stability limits cause active power oscillations between generators and the network. These electromechanical oscillations of the rotor can be reduced by controlled influence of the excitation current. Hence PSS 33 evaluates the sampled data in view of these power oscillations and derives a signal which influences the set point of the converter gate drives 31, or the AVR in particular, with the aim of damping either local oscillations, oscillations between network areas or global oscillations.

The converter control unit 3 is also equipped with synchronization means 34 that provide time stamps according to a global time reference such as the one transmitted with GPS signals. Synchronization means 34 acts as a clock for A/D converter 30. Converter control unit 3 further comprises a phasor data facility 35 for producing synchronized phasor values in the form of magnitudes or phase angles of the generator current and voltage. Based on the data sampled by A/D converter 30, this necessitates a down-sampling to a common phasor update frequency of 10 Hz. In other words, the phasor data is determined at least every 100 milliseconds, with a temporal resolution of the associated time stamp derived from the synchronization means 34 of preferably less than 1 ms.

The power system stabilizer 33 may be provided as a separate, detachable PSS unit of the converter control unit 3, and even be a stand-alone device positioned in the vicinity of a housing of the converter gate drives 31. In this case, the A/D converter 30, the synchronization means 34 and phasor data facility 35 may likewise be part of said PSS unit. Accordingly, the present disclosure also relates to a computer program product including computer program code means for controlling a processor of the PSS unit in order to enable the latter to produce phasor data.

In order for the targeted Wide-Area (WA) monitoring, protection and control functions to be properly executable, the synchronized phasor data from disparate sources, often separated by hundreds of kilometres, are analysed in conjunction. Hence a communication interface 36 for forwarding the measured phasor data to a System Protection Centre (SPC) or an Intelligent Electronic Device (IED) of a Substation Automation system represents a further I/O component of the excitation system 3. The communication interface 36 may thus be a bus coupler for MODBUS or Profibus, an Ethernet adapter for a LAN integration (TCP/IP), or an interface to a dedicated communication channel.

Analysis of the phasor data then enables implementing WA functionality such as line differential protection, line thermal monitoring, phase angle monitoring, power oscillation protection and voltage stability monitoring, which are summarized in the unpublished European Patent Application 05405615.5. These WA applications provide control signals, whether calculated at the SPC or at the location of the phasor data facility 35, which likewise can be used to influence the set point of the converter gate drives 31.

In short, a converter control unit or power system stabilizing unit for counteracting oscillations in electric power systems 1 is equipped and employed to provide and processes information for system-wide monitoring, protection, control and metering. It comprises means 30 for synchronized (e.g. via GPS or another absolute/global time reference) sampling of voltages and/or currents, means for down-sampling in order to decrease the number of samples, and means 35 for calculating phasors, i.e. time stamped amplitude and phase angle of the voltages and/or currents. Sampled or down-sampled data can be applied to filters with fixed or time varying coefficients. The phasors may be stored in the power system stabilizing unit, or transmitted according to the IEEE 1344 synchrophasor standard (PC37.118) and/or similar protocols. A system protection centre or any decentralized calculation system then uses the above phasors from one or a plurality of locations to perform any power system protection, control and analysis computations, or to determine the RMS values of the signals for metering functions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 power system
11 bus bar
12 transmission line
13 generator
14 excitation converter
15 power transformer
16 power converter
17 source or consumer of active power
18 instrument transformers 20 phasor measurement unit
21 GPS satellite
22 system protection centre
3 converter control unit
30 A/D converter
31 converter gate drives
32 excitation power converter
33 power system stabilizer
34 synchronization means
35 phasor data facility
36 communication interface

What is claimed is:

1. A converter control unit for controlling a converter based on power electronic semiconductor components and arranged in a generator excitation system of an electric power system, the unit comprising:
    synchronization means providing time-stamps for global time synchronization;
    a phasor data facility for calculating, based on signals from an instrument transformer representing a generator current $I_G$, or generator voltage $V_G$ of the power system, time-stamped synchronized phasor data;
    a power system stabilizer for controlling, in view of stabilizing the power system against power oscillations and based on the generator voltage $V_G$ and/or the generator current $I_G$ of the generator, an excitation converter of the generator excitation system, and
    means for sampling, at a first sampling rate above a network frequency of the power system, a generator signal indicative of the generator voltage $V_G$ and/or the generator current $I_G$, thus producing a sampled generator signal,
    wherein the phasor data facility comprises means for down-sampling the sampled generator signal.

2. The converter control unit according to claim 1, wherein the synchronization means acts as a clock for the sampling means.

3. The converter control unit according to claim 1, comprising:
    a communication interface for communicating the time-stamped synchronized phasor data.

4. A method of performing, based on time-stamped synchronized phasor data, wide-area protection and control applications on an electric power system, wherein the power system comprises a converter based on power electronic semiconductor components and operated by means of a dedicated converter control unit, a generator and an associated excitation system with a power system stabilizer, the method comprising:
    providing time-stamps for global time synchronization by a synchronization means and calculating time-stamped synchronized phasor data by a phasor data facility integrated into the converter control unit;
    deriving wide-area protection and control commands from the time-stamped synchronized phasor data;
    applying the protection and control commands to the converter;
    controlling, in view of stabilizing the power system against power oscillations and based on a generator voltage $V_G$ and/or a generator current $I_G$ of the generator, an excitation converter of the generator excitation system;
    sampling, at a first sampling rate above a network frequency of the power system, a generator signal indicative of the generator voltage $V_G$ and/or the generator current $I_G$, thus producing a sampled generator signal; and
    calculating time-stamped synchronized phasor data based on the generator voltage $V_G$ and/or the generator current $I_G$ by down-sampling the sampled generator signal.

5. The method according to claim 4, wherein it further comprises:
    providing, by the converter, active or reactive power in order to damp power oscillations in at least a part of the power system.

6. The method according to claim 5, comprising:
    communicating the time-stamped synchronized phasor data via a communication interface at the converter control unit; and
    receiving the protection and control signals via the communication interface.

7. The method according to claim 4, comprising:
    communicating the time-stamped synchronized phasor data via a communication interface at the converter control unit; and
    receiving the protection and control signals via the communication interface.

8. An arrangement for wide-area protection and control of an electric power system, the arrangement comprising:
    a converter based on power electronic semiconductor components; and
    a dedicated converter control unit that includes synchronization means and a phasor data facility integrated into the converter control unit, wherein the dedicated converter control unit functions to:
    provide time-stamps for global time synchronization and calculate time-stamped synchronized phasor data,
    issue wide-area protection and control commands based on the time-stamped synchronized phasor data, and
    apply the protection and control commands to the converter, and
    wherein the phasor data facility comprises means for sampling a generator signal of the power system and means for down-sampling the sampled generator signal, which are time-stamped and used to calculate the time-stamped synchronized phasor data.

\* \* \* \* \*